(12) United States Patent
Komatsu et al.

(10) Patent No.: US 9,576,742 B2
(45) Date of Patent: Feb. 21, 2017

(54) SOLID ELECTROLYTE CAPACITOR AND MANUFACTURING METHOD FOR SAME

(71) Applicant: RUBYCON CORPORATION, Nagano (JP)

(72) Inventors: Akihiko Komatsu, Nagano (JP); Yoshishige Sakurai, Nagano (JP); Hiroki Tsutsui, Nagano (JP); Kazuyasu Watanabe, Nagano (JP)

(73) Assignee: RUBYCON CORPORATION, Nagano (JP)

( * ) Notice: Subject to any disclaimer, the term of this patent is extended or adjusted under 35 U.S.C. 154(b) by 140 days.

(21) Appl. No.: 14/431,776

(22) PCT Filed: Sep. 25, 2013

(86) PCT No.: PCT/JP2013/075952
§ 371 (c)(1),
(2) Date: Mar. 27, 2015

(87) PCT Pub. No.: WO2014/050913
PCT Pub. Date: Apr. 3, 2014

(65) Prior Publication Data
US 2015/0255220 A1    Sep. 10, 2015

(30) Foreign Application Priority Data

Sep. 29, 2012 (JP) ................ 2012-218959

(51) Int. Cl.
*H01G 9/028* (2006.01)
*H01G 9/00* (2006.01)
(Continued)

(52) U.S. Cl.
CPC ........... *H01G 9/028* (2013.01); *H01G 9/0036* (2013.01); *H01G 9/02* (2013.01); *H01G 9/151* (2013.01); *H01G 9/15* (2013.01)

(58) Field of Classification Search
None
See application file for complete search history.

(56) References Cited

U.S. PATENT DOCUMENTS

| 2003/0170520 A1* | 9/2003 | Fujii | H01M 4/8807 |
| | | | 429/432 |
| 2007/0202375 A1* | 8/2007 | Jung | C08G 73/1042 |
| | | | 429/482 |

(Continued)

FOREIGN PATENT DOCUMENTS

| JP | 4-53115 A | 2/1992 |
| JP | 2008-109065 A | 5/2008 |
| JP | 2010-161182 A | 7/2010 |

OTHER PUBLICATIONS

International Search Report mailed Dec. 24, 2013, corresponding to International application No. PCT/JP2013/075952.

*Primary Examiner* — Dion R Ferguson
(74) *Attorney, Agent, or Firm* — Hauptman Ham, LLP

(57) ABSTRACT

A solid electrolyte capacitor includes an anode foil on a surface of which an oxide film is formed, a cathode foil, and a separator. A gap between the anode foil and the cathode foil is filled with a solid electrolyte which contains a conductive fine particles containing a conductive polymer compound and a hydrophilic polymer compound. The hydrophilic polymer compound has a structure expressed by a following chemical formula (I) and a structure expressed by a following chemical formula (II).

$$—(R^1—O)— \qquad (I)$$

$$—(R^2—O)— \qquad (II)$$

In the formula (I) and the formula (II), $R^1$ and $R^2$ are groups selected from the set consisting of a substituted or unsub- (Continued)

stituted alkylene, a substituted or unsubstituted alkenylene, and a substituted or unsubstituted phenylene, and represent mutually different groups.

17 Claims, 10 Drawing Sheets

(51) Int. Cl.
*H01G 9/02* (2006.01)
*H01G 9/15* (2006.01)

(56) References Cited

U.S. PATENT DOCUMENTS

2010/0165546 A1  7/2010  Yoshida et al.
2012/0141913 A1* 6/2012  Lee ..................... C08J 5/2256
                                              429/492

* cited by examiner

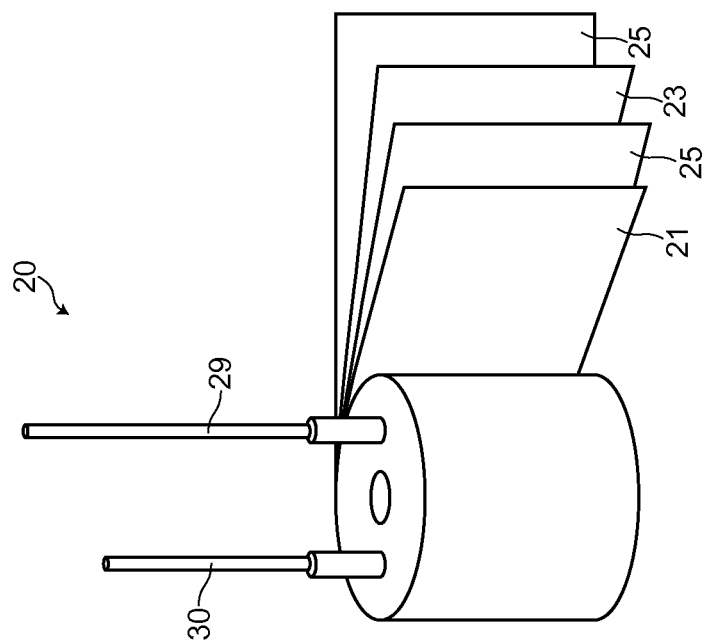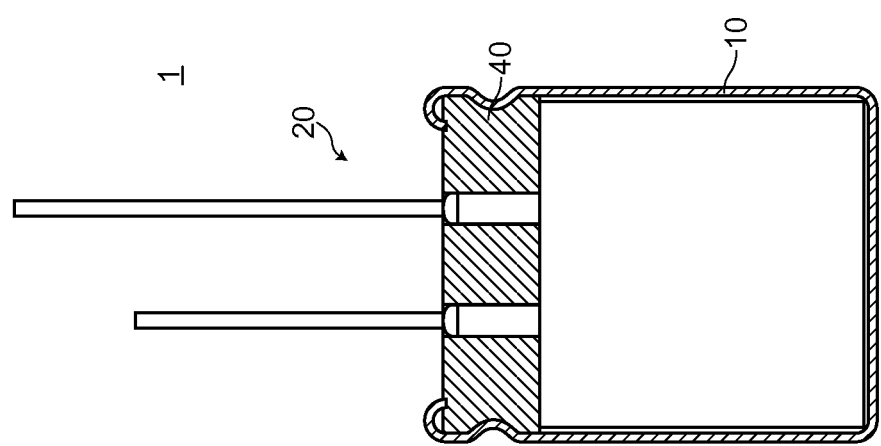
FIG.1B
FIG.1A

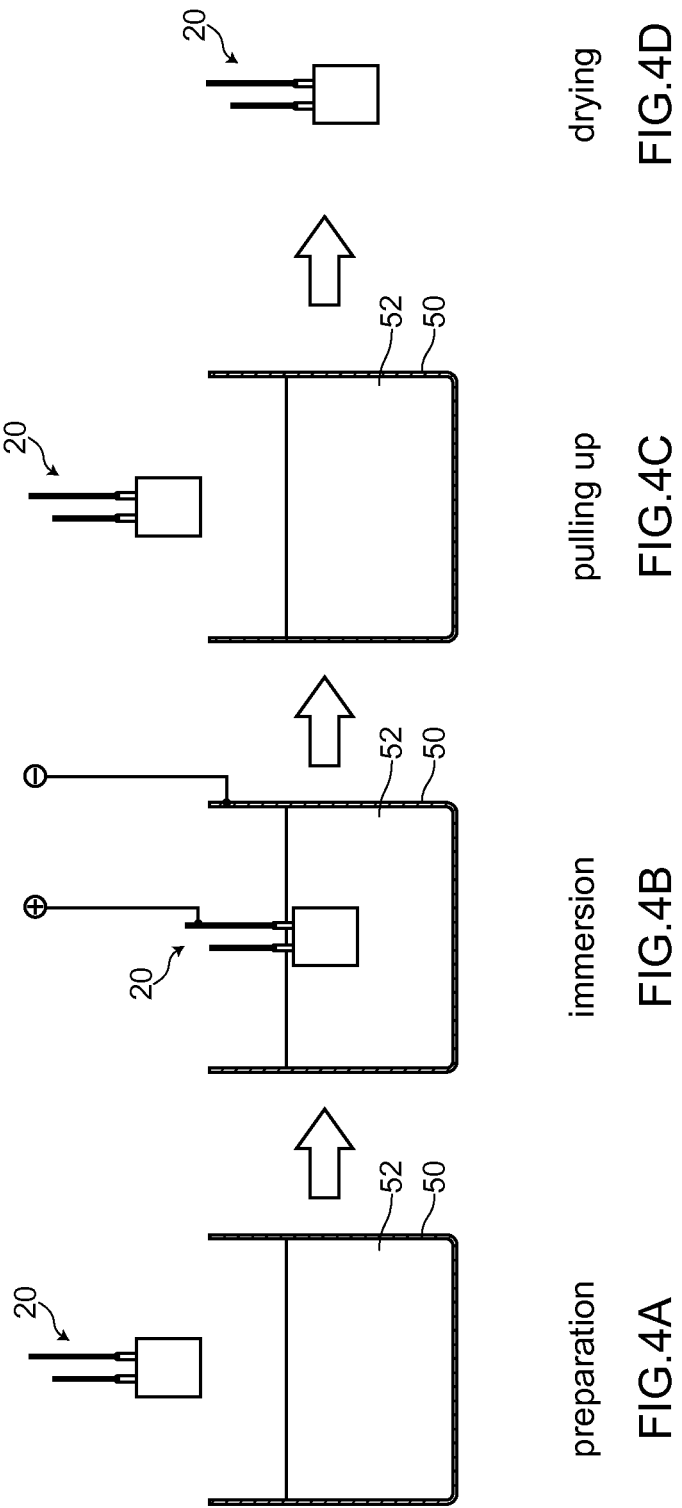

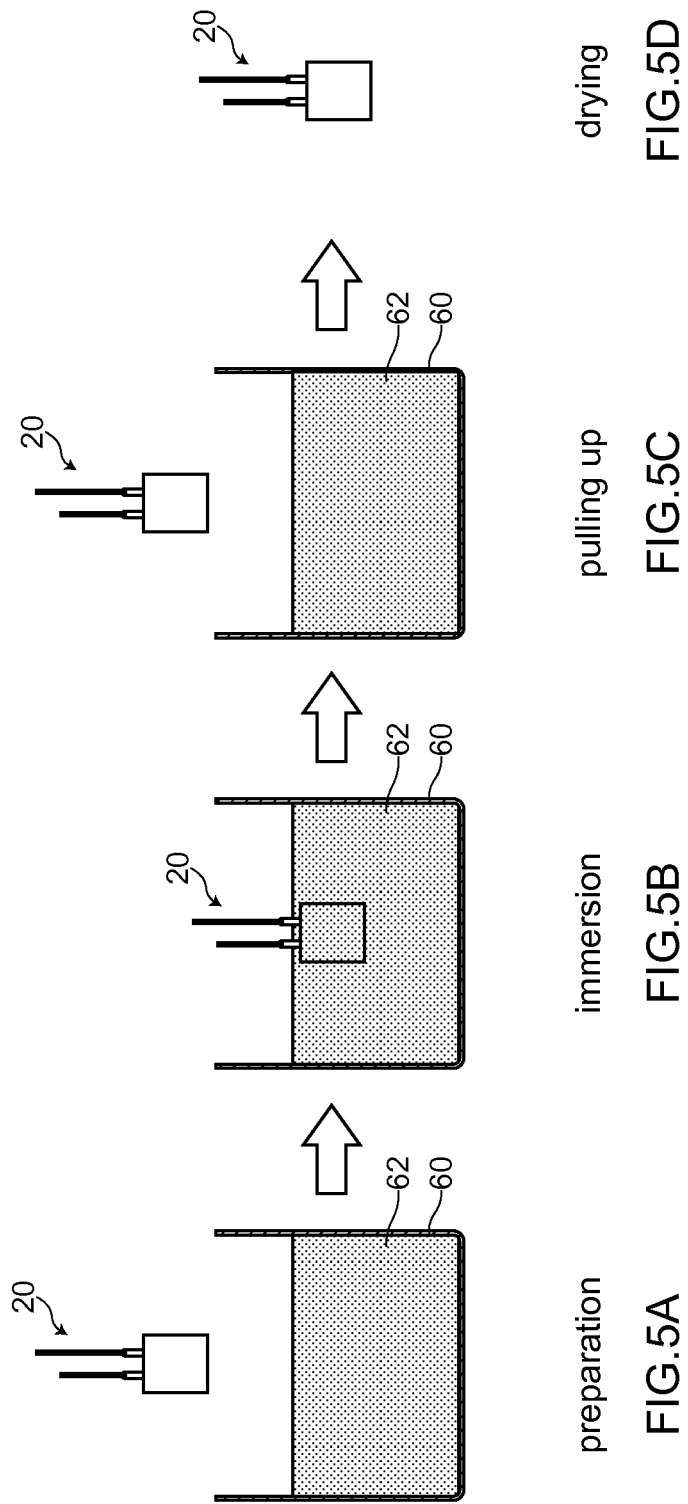

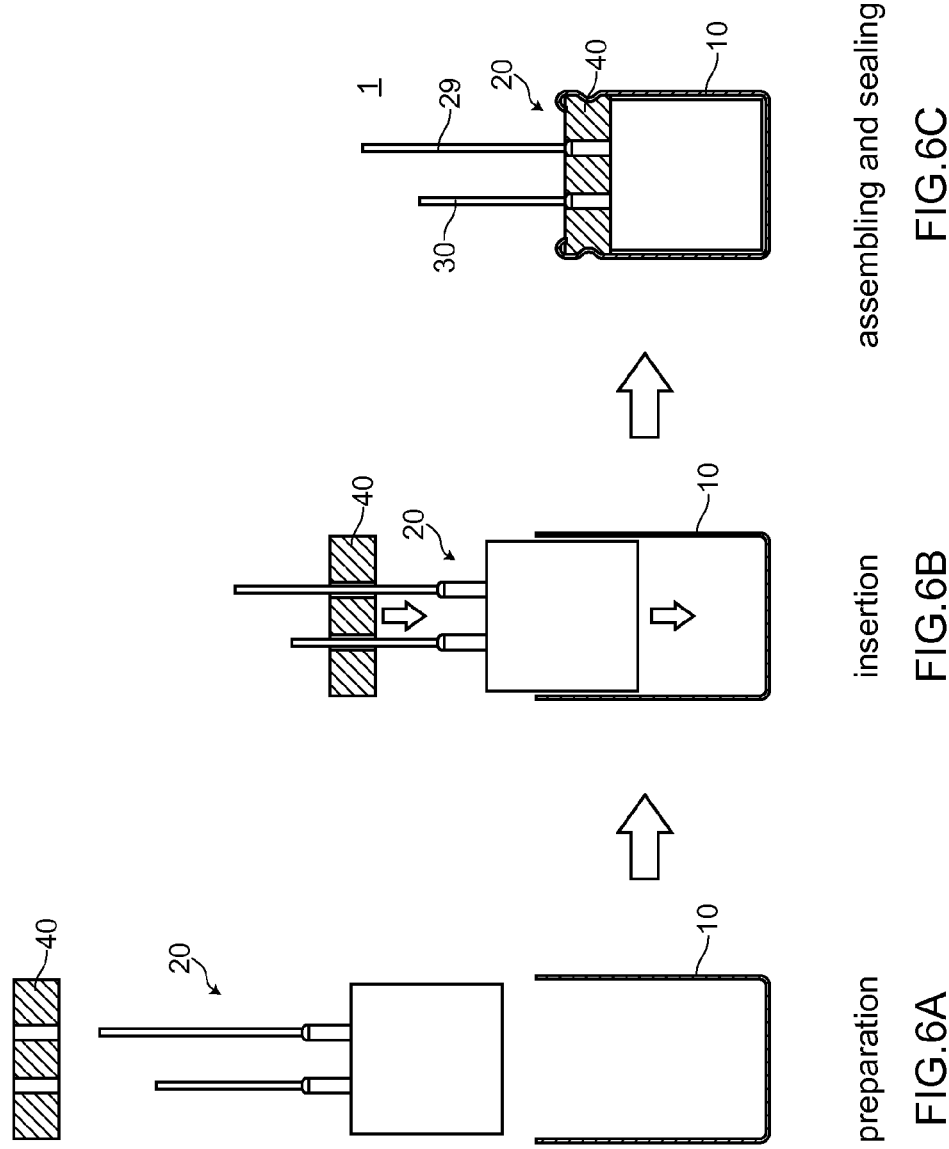

FIG.7A

| hydrophilic polymer compound | hydrophilic polymer compound 1 | hydrophilic polymer compound 2 | hydrophilic polymer compound 3 |
|---|---|---|---|
| structure | copolymer of PEG and PPG | PEG | PEG |
| chemical formula | -(C2H4O)n-(C3H6O)m- | -(C2H4O)n- | -(C2H4O)n- |
| number average molecular weight | 2800 | 3000 | 300 |
| form at normal temperature | viscous | solid | viscous |

FIG.7B

| | | solid electrolyte capacitor using hydrophilic polymer compound 1 | solid electrolyte capacitor using hydrophilic polymer compound 2 | solid electrolyte capacitor using hydrophilic polymer compound 3 |
|---|---|---|---|---|
| test example 1 | form of specimen | layer of hydrophilic polymer compound 1 (viscous) | film of hydrophilic polymer compound 2 (solid) | layer of hydrophilic polymer compound 3 (viscous) |
| | evaluation result | good | bad | bad |
| test example 2 | form of specimen | layer of hydrophilic polymer compound 1 (viscous) | film of hydrophilic polymer compound 2 (solid) | layer of hydrophilic polymer compound 3 (viscous) |
| | evaluation result | good | good | bad |
| test example 3 | form of specimen | pellet of hydrophilic polymer compound 1 (viscous) | pellet of hydrophilic polymer compound 2 (solid) | pellet of hydrophilic polymer compound 3 (viscous) |
| | evaluation result | good | bad | good |

SOLID ELECTROLYTE CAPACITOR AND MANUFACTURING METHOD FOR SAME

RELATED APPLICATIONS

The present application is a National Phase of International Application Number PCT/JP2013/075952, filed Sep. 25, 2013, and claims priority of Japanese Patent Application No. 2012-218959 filed on Sep. 29, 2012.

TECHNICAL FIELD

The present invention relates to a solid electrolyte capacitor and a method of manufacturing the solid electrolyte capacitor.

BACKGROUND ART

Conventionally, there has been known a method of manufacturing a solid electrolyte capacitor which includes steps where a solution containing a conductive polymer and an ion conductive compound therein in a dispersed manner is adhered to a surface of an oxide film (dielectric layer) formed on a surface of an anode foil and, then, the solution is dried thus forming a solid electrolyte layer on a surface of the oxide film (see patent document 1, for example). In the conventional method of manufacturing a solid electrolyte capacitor, an ion conductive compound is a polymer having a repeating unit which has an electron donating site (nucleophilic site) and exhibits ion conductivity under the presence of electrolyte.

According to the conventional method of manufacturing a solid electrolyte capacitor, a solid electrolyte layer which contains an ion conductive compound in addition to a conductive polymer can be formed and hence, conductivity of a solid electrolyte layer is increased whereby it is possible to manufacture a solid electrolyte capacitor which exhibits low ESR (Equivalent Series Resistance).

Further, according to the conventional method of manufacturing a solid electrolyte capacitor, a solid electrolyte layer can be formed without using an oxidizing agent for polymerization and hence, the deterioration of an oxide film caused by the presence of an oxidizing agent for polymerization can be eliminated whereby it is possible to manufacture a solid electrolyte capacitor having a high breakdown strength and a low leakage current.

Still further, according to the conventional method of manufacturing a solid electrolyte capacitor, the above-mentioned ion conductive compound functions as an oxygen supply source and hence, even when a defect occurs in an oxide film in the course of manufacturing a solid electrolyte capacitor, a defect occurred part is repaired due to a function of the ion conductive compound. Also due to the above-mentioned reason, it is possible to manufacture a solid electrolyte capacitor having a high breakdown strength and a low leakage current.

Still further, according to the conventional method of manufacturing a solid electrolyte capacitor, the above-mentioned ion conductive compound functions as an oxygen supply source and hence, even when a defect occurs in an oxide film as a result of using a solid electrolyte capacitor for a long time, a defect occurred part is repaired due to a function of the ion conductive compound. Also due to the above-mentioned reason, it is possible to manufacture a solid electrolyte capacitor having an extended lifetime.

CITATION LIST

Patent Literature

Patent document 1: JP-A-2008-109065

SUMMARY OF INVENTION

Technical Problem

In the technical field of capacitors, there has been constantly a demand for a capacitor having a high breakdown strength, a low leakage current and a longer lifetime than conventional capacitors, and the technical field of solid electrolyte capacitors is also not the exception with respect to such a demand.

The present invention has been made in view of the above-mentioned circumstances, and it is an object of the present invention to provide a solid electrolyte capacitor having a high breakdown strength, a low leakage current and a longer lifetime than conventional capacitors. It is another object of the present invention to provide a method of manufacturing a solid electrolyte capacitor by which such a solid electrolyte capacitor can be manufactured.

Means for Solving the Problem

[1] A solid electrolyte capacitor of the present invention includes: an anode foil on a surface of which an oxide film is formed; a cathode foil; and a separator disposed between the anode foil and the cathode foil, where a gap formed between the anode foil and the cathode foil is filled with a solid electrolyte which contains a conductive fine particles containing a conductive polymer compound and a hydrophilic polymer compound, wherein the hydrophilic polymer compound has a structure expressed by a following chemical formula (I) and a structure expressed by a following chemical formula (II).

$$—(R^1—O)— \quad (I)$$

$$—(R^2—O)— \quad (II)$$

(In the formula (I) and the formula (II), $R^1$ and $R^2$ are groups selected from the set consisting of a substituted or unsubstituted alkylene, a substituted or unsubstituted alkenylene, and a substituted or unsubstituted phenylene, and represent mutually different groups).

According to the solid electrolyte capacitor of the present invention, a solid electrolyte can be formed without using an oxidizing agent for polymerization and hence, in the same manner as a conventional solid electrolyte capacitor, it is possible to provide a solid electrolyte capacitor having a high breakdown strength and a low leakage current without bringing about the deterioration of an oxide film which may be caused under the presence of an oxidizing agent for polymerization.

According to the solid electrolyte capacitor of the present invention, a hydrophilic polymer compound is filled in the gap formed between the anode foil and the cathode foil and hence, even when a defect occurs in an oxide film in the course of manufacturing a solid electrolyte capacitor, moisture which the hydrophilic polymer compound retains can be used for repairing the above-mentioned defect occurred part whereby it is also possible to provide a solid electrolyte capacitor having a high breakdown strength and a low leakage current.

According to the solid electrolyte capacitor of the present invention, a hydrophilic polymer compound is filled in the gap formed between the anode foil and the cathode foil and hence, even when a defect occurs in an oxide film as a result of use of the solid electrolyte capacitor for a long time, moisture which the hydrophilic polymer compound retains can be used for repairing the above-mentioned defect occurred part whereby it is possible to manufacture a solid electrolyte capacitor having an extended lifetime.

Further, according to the solid electrolyte capacitor of the present invention, the hydrophilic polymer compound has the above-mentioned structure expressed by the chemical formula (I) and the above-mentioned structure expressed by the chemical formula (II) and hence, the solid electrolyte capacitor of the present invention acquires the following advantageous effects (a) and (b).

(a) As can be also understood from an experimental example (experimental example 2) described later, the content of moisture in the hydrophilic polymer compound minimally changes (that is, a water retention ability of the hydrophilic polymer compound is increased) and hence, even when the solid electrolyte capacitor is used for a long time, moisture minimally leaves from the solid electrolyte capacitor.

(b) As can be also understood from an experimental example (experimental example 3) described later, a change in form of the hydrophilic polymer compound (eventually the solid electrolyte) due to a change in temperature minimally occurs and hence, even when a temperature elevation and lowering cycle between a normal temperature (a temperature when the solid electrolyte capacitor is not used) and a high temperature (a temperature when the solid electrolyte capacitor is used) is repeated many times, an oxide film minimally deteriorates. As a result, even when the solid electrolyte capacitor is used under a harsh condition for a long time, moisture can be retained over a longer time than a conventional solid electrolyte capacitor and, at the same time, a change in form of the hydrophilic polymer compound can be suppressed over a longer time than a conventional solid electrolyte capacitor and hence, it is possible to provide a solid electrolyte capacitor having a longer lifetime than a conventional solid electrolyte capacitor.

As a result, the solid electrolyte capacitor of the present invention becomes a solid electrolyte capacitor having a high breakdown strength, a low leakage current and a longer extended lifetime than a conventional solid electrolyte capacitor.

In the solid electrolyte capacitor of the present invention, the hydrophilic polymer compound has the above-mentioned structure expressed by the chemical formula (I) and the above-mentioned structure expressed by the chemical formula (II). Accordingly, it is possible to finely adjust various attributes of the hydrophilic polymer compound such as a viscosity, a solidification point, a melting point or a boiling point in a wide range thus providing a solid electrolyte capacitor flexibly adaptable to various and broad applications.

Here, an oxide film repairing function in the present invention is explained. With respect to the anode foil and the cathode foil, there may be a case where a defect occurs in an oxide film when a capacitor element is stored in a metal case and is sealed or when an impact or heat (for example, heat generated at the time of mounting the solid electrolyte capacitor on a printed circuit board by soldering) is applied to the solid electrolyte capacitor from the outside.

In this case, in the vicinity of an end surface of the anode foil, aluminum exposed due to a defect formed on an oxide film and moisture supplied from the hydrophilic polymer compound generate the following reaction so that the oxide film performs self-repairing.

$$2Al+3H_2O \rightarrow Al_2O_3+3H_2\uparrow$$

Also with respect to the cathode foil, aluminum exposed due to a defect formed on an oxide film and moisture supplied from the hydrophilic polymer compound generate the following reaction so that the oxide film performs self-repairing.

$$Al+(n+3)H_2O \rightarrow Al(OH)_3 \cdot nH_2O+3/2H_2\uparrow$$

[2] In the solid electrolyte capacitor of the present invention, it is preferable that the hydrophilic polymer compound be made of a block copolymer including a structure expressed by a following chemical formula (III) and a structure expressed by a following chemical formula (IV).

$$-(R^1-O)n- \qquad (III)$$

$$-(R^2-O)m- \qquad (IV)$$

(In the formula (III) and the formula (IV), n and m are respectively integers which fall within a range of 1 to 2,000).

By forming the hydrophilic polymer compound using the block copolymer which includes the above-mentioned structure expressed by the chemical formula (III) and the above-mentioned structure expressed by the chemical formula (IV), it is possible to provide a hydrophilic polymer compound having a high moisture retention ability thus exhibiting an excellent oxide film repairing function.

Further, various attributes of the hydrophilic polymer compound such as viscosity, a solidification point, a melting point and a boiling point can be easily adjusted by suitably selecting and adjusting kinds of $R^1$, $R^2$, ranges of n, m and the number and the distribution of blocks and hence, it is possible to provide a solid electrolyte capacitor which is flexibly adaptable to broad and various applications.

[3] In the solid electrolyte capacitor of the present invention, it is preferable that the hydrophilic polymer compound be made of a copolymer including a structure expressed by a following chemical formula (V).

$$-[(R^1-O)-(R^2-O)]_l- \qquad (V)$$

(in the formula (V), l is an integer which falls within a range of 2 to 2,000.)

By forming the hydrophilic polymer compound using the copolymer which includes the above-mentioned structure expressed by the chemical formula (V), it is also possible to provide a hydrophilic polymer compound having a high moisture retention ability thus exhibiting an excellent oxide film repairing function.

Further, various attributes of the hydrophilic polymer compound such as viscosity, a solidification point, a melting point and a boiling point can be easily adjusted by suitably selecting or adjusting kinds of $R^1$, $R^2$ and a range of l and hence, it is possible to provide a solid electrolyte capacitor which is flexibly adaptable to broad and various applications.

[4] In the solid electrolyte capacitor of the present invention, it is preferable that a molecular weight of the hydrophilic polymer compound be more than or equal to 500.

Due to such a constitution, the content of moisture in the hydrophilic polymer compound minimally changes (that is, a moisture retention ability of the hydrophilic polymer compound is increased). As a result, even when the solid electrolyte capacitor is used for a long time, the moisture leaves more minimally. From this point of view, it is preferable that a molecular weight of the hydrophilic polymer compound be more than or equal to 1000, and it is more preferable that the molecular weight of the hydrophilic polymer compound be more than or equal to 2000.

On the other hand, in the solid electrolyte capacitor of the present invention, it is preferable that a molecular weight of the hydrophilic polymer compound be less than or equal to 500000.

Due to such a constitution, a solid electrolyte filled solution can easily contain a hydrophilic polymer compound. From this point of view, it is preferable that a molecular weight of the hydrophilic polymer compound be less than or equal to 100000, and it is more preferable that the molecular weight of the hydrophilic polymer compound be less than or equal to 10000.

[5] In the solid electrolyte capacitor of the present invention, it is preferable that when a differential scanning calorimetry curve of the hydrophilic polymer compound is measured using a differential scanning calorimeter, an endothermic peak of the hydrophilic polymer compound based on a change in form is not observed at a temperature higher than a room temperature.

Due to such a constitution, a change in form of the hydrophilic polymer compound (eventually the solid electrolyte) due to a change in temperature minimally occurs and hence, even when a temperature elevation and lowering cycle between a normal temperature (a temperature when the solid electrolyte capacitor is not used) and a high temperature (a temperature when the solid electrolyte capacitor is used) is repeated many times, an oxide film minimally deteriorates.

[6] In the solid electrolyte capacitor of the present invention, it is preferable that the hydrophilic polymer compound contain moisture such that the content of moisture falls within a range of 1 wt % to 40 wt % with respect to the hydrophilic polymer compound.

The reason that the content of moisture in the hydrophilic polymer compound is set to more than or equal to 1 wt % is as follows. In the case where the content of moisture in the hydrophilic polymer compound is set to more than or equal to 1 wt %, even when a defect occurs in an oxide film as a result of the use of the solid electrolyte capacitor for a long time, the above-mentioned defect occurred part is effectively repaired due to a function of moisture which the hydrophilic polymer compound retains and hence, the solid electrolyte capacitor having an extended lifetime can be provided. The reason that the content of moisture in the hydrophilic polymer compound is set to less than or equal to 40 wt % is as follows. Even when the content of moisture in the hydrophilic polymer compound is not set to more than 40 wt %, the hydrophilic polymer compound can usually exhibit a sufficient oxide film repairing function. Further, when the content of moisture in the hydrophilic polymer compound is set to less than or equal to 40 wt %, a problem of freezing under a low temperature environment or a problem of the elevation of an internal pressure under a high temperature environment can be reduced.

[7] In the solid electrolyte capacitor of the present invention, it is preferable that the hydrophilic polymer compound contain a hydrophilic functional group at a side chain.

Due to such a constitution, a moisture retention ability of the hydrophilic polymer compound can be further increased.

[8] In the solid electrolyte capacitor of the present invention, it is preferable that the hydrophilic functional group be a hydroxy group, an amino group, a carbonyl group, a carboxyl group, a nitro group, a sulfonic acid group, an amide group or a phosphate ester group.

Due to such a constitution, a moisture retention ability of the hydrophilic polymer compound can be further increased.

[9] In the solid electrolyte capacitor of the present invention, it is preferable that the hydrophilic polymer compound contain a bonding chain which exhibits hydrogen bonding in a main chain.

Also due to such a constitution, a moisture retention ability of the hydrophilic polymer compound can be further increased.

[10] In the solid electrolyte capacitor of the present invention, it is preferable that the bonding chain which exhibits hydrogen bonding be made of an ether group, a carbonyl group, an amide group or an ester group.

Due to such a constitution, a moisture retention ability of the hydrophilic polymer compound can be further increased.

[11] In the solid electrolyte capacitor of the present invention, it is preferable that the conductive polymer compound be made of polyethylene dioxithiophene, polythiophene, polypyrrole or polyaniline.

Due to such a constitution, conductive fine particles having high conductivity can be formed and, eventually, a solid electrolyte having high conductivity can be formed thus providing a solid electrolyte capacitor having a low ESR.

[12] In the solid electrolyte capacitor of the present invention, it is preferable that the conductive fine particles further contain a dopant made of a polystyrene sulfonic acid, a toluene sulfonic acid, an alkylbenzene sulfonic acid or a naphthalene sulfonic acid.

Also due to such a constitution, conductive fine particles having high conductivity can be formed and, eventually, a solid electrolyte having high conductivity can be formed thus providing a solid electrolyte capacitor having a low ESR.

[13] In the solid electrolyte capacitor of the present invention, it is preferable that an average particle size of the conductive fine particles be less than or equal to 1 μm.

Due to such a constitution, conductive fine particles can be filled into a gap formed between the anode foil and the cathode foil with high density thus providing a solid electrolyte capacitor having a lower ESR.

[14] In the solid electrolyte capacitor of the present invention, it is preferable that the solid electrolyte capacitor be a winding-type solid electrolyte capacitor.

In the solid electrolyte capacitor of the present invention, the hydrophilic polymer compound containing a proper amount of moisture has a proper degree of viscosity and excellent property in form stability and hence, due to the presence of the hydrophilic polymer compound, form stability of the capacitor element constituted of the anode foil, the cathode foil, the separator and the solid electrolyte is high. Accordingly, it is safe to say that the present invention exhibits more adaptability when the solid electrolyte capacitor is a winding-type solid electrolyte capacitor having property by which the forms of the anode foil, the cathode foil, the separator and the solid electrolyte are liable to become unstable.

[15] A method of manufacturing a solid electrolyte capacitor of the present invention includes:

a capacitor element preparing step for preparing a capacitor element which includes an anode foil on a surface of which an oxide film is formed; a cathode foil; and a separator disposed between the anode foil and the cathode foil; and a solid electrolyte filling step for filling a solid electrolyte which contains conductive fine particles containing a conductive polymer compound and a hydrophilic polymer compound into a gap formed between the anode foil and the cathode foil by impregnating a solid electrolyte filled solution containing the conductive fine particles and the hydrophilic polymer compound into the gap disposed between the anode foil and the cathode foil and by drying the solid electrolyte filled solution, wherein the hydrophilic polymer compound has a structure expressed by a following chemical formula (I) and a structure expressed by a following chemical formula (II).

$$—(R^1—O)—  \quad (I)$$

$$—(R^2—O)—  \quad (II)$$

(In the formula (I) and the formula (II), $R^1$ and $R^2$ are groups selected from the set consisting of a substituted or unsubstituted alkylene, a substituted or unsubstituted alkenylene, and a substituted or unsubstituted phenylene, and represent mutually different groups).

According to the method of manufacturing a solid electrolyte capacitor of the present invention, as described previously, it is possible to manufacture a solid electrolyte capacitor having a high breakdown strength, a low leakage current and a more extended lifetime than a conventional solid electrolyte capacitor by a simple method.

[16] In the method of manufacturing a solid electrolyte capacitor of the present invention, it is preferable that the method further include, between the capacitor element preparing step and the solid electrolyte filling step, a chemical conversion treatment step for repairing an oxide film defect occurred part which may exist on at least an edge surface or a front surface of the anode foil when the capacitor element is immersed into a chemical conversion liquid.

In the step of preparing the capacitor element, there may be a case where a defect occurred part of an oxide film is formed on an edge surface or a front surface of the anode foil. However, when the defect occurred part of the oxide film formed in the step of preparing the capacitor element is repaired using moisture which the hydrophilic polymer compound retains, there is a possibility that a large amount of moisture which the hydrophilic polymer compound retains is consumed in this step so that a defect repairing ability of the hydrophilic polymer compound is lowered. However, by adopting the above-mentioned method, it is possible to suppress the consumption of moisture which the hydrophilic polymer compound retains in the step of preparing the capacitor element and hence, a solid electrolyte capacitor having a more extended lifetime can be manufactured.

[17] In the method of manufacturing a solid electrolyte capacitor of the present invention, it is preferable that the solid electrolyte filled solution be an aqueous solution.

By adopting such a method, it is possible to make the hydrophilic polymer compound retain a larger amount of moisture and hence, it is possible to manufacture a solid electrolyte capacitor having a more extended lifetime.

BRIEF DESCRIPTION OF DRAWINGS

FIG. 1A and FIG. 1B are views for explaining a solid electrolyte capacitor 1 according to an embodiment.
FIG. 4A to FIG. 4D are views for explaining the method of manufacturing a solid electrolyte capacitor according to the embodiment (particularly, a chemical conversion treatment step).
FIG. 5A to FIG. 5D are views for explaining the method of manufacturing a solid electrolyte capacitor according to the embodiment (particularly, a solid electrolyte filling step).
FIG. 6A to FIG. 6C are views for explaining the method of manufacturing a solid electrolyte capacitor according to the embodiment (particularly, an assembling and sealing step).
FIG. 7A and FIG. 7B are tables showing data on respective specimens used in test examples and a result of evaluation of the test examples.

DESCRIPTION OF EMBODIMENTS

Hereinafter, a solid electrolyte capacitor and a method of manufacturing the solid electrolyte capacitor according to the present invention are explained in conjunction with an embodiment shown in drawings.

Embodiment

1. Solid Electrolyte Capacitor According to the Embodiment

Figure 2A:
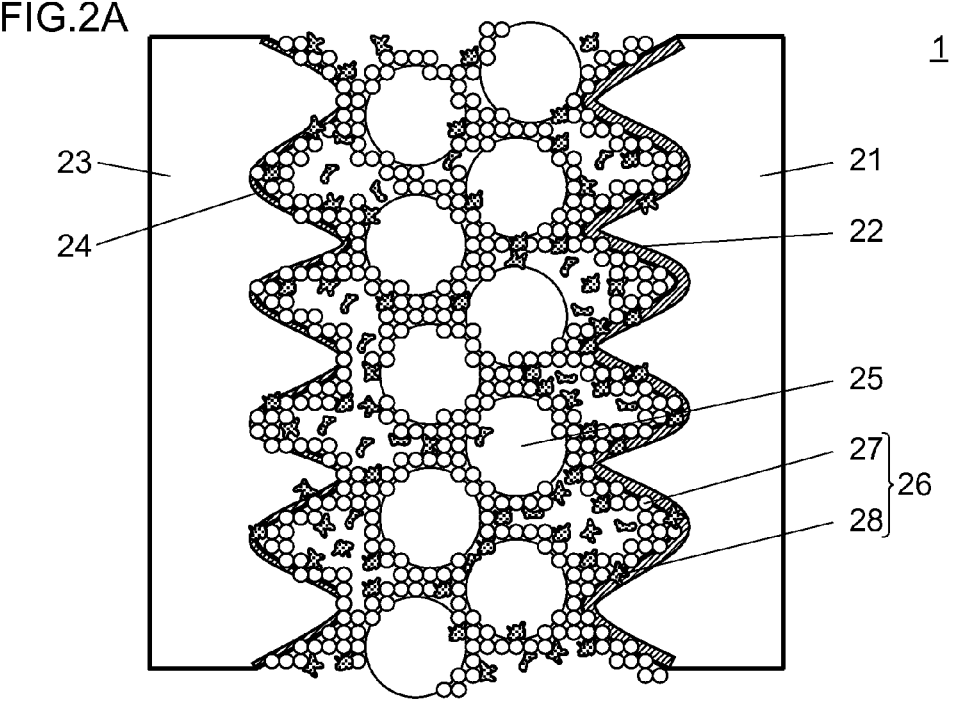
FIG. 2A and FIG. 2B are views for explaining the solid electrolyte capacitor 1 according to the embodiment.
Figure 2B:
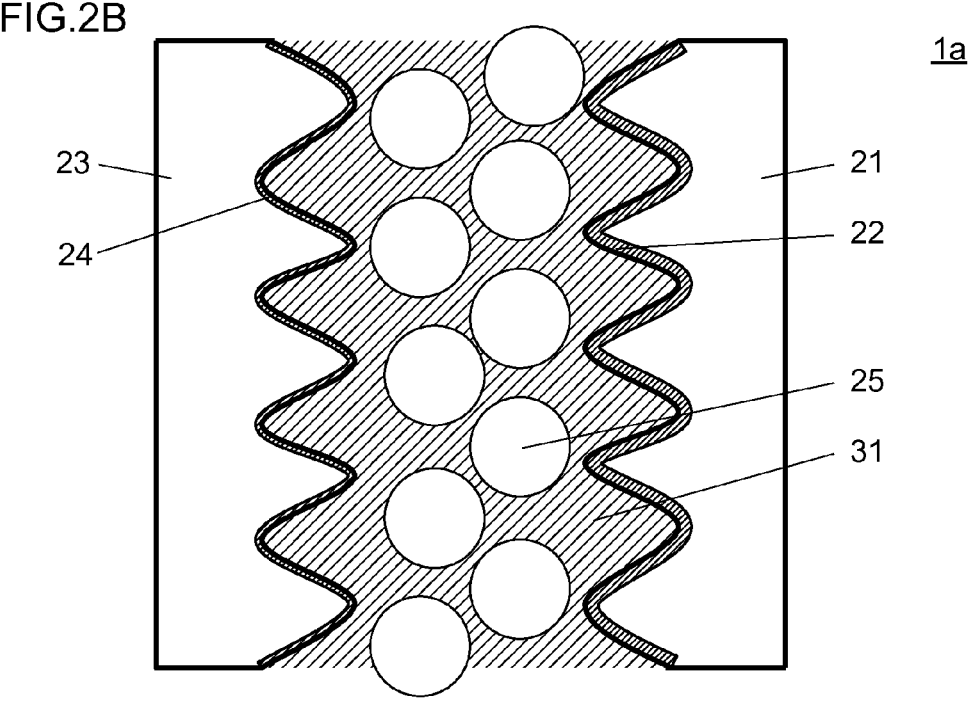
Figure 3:
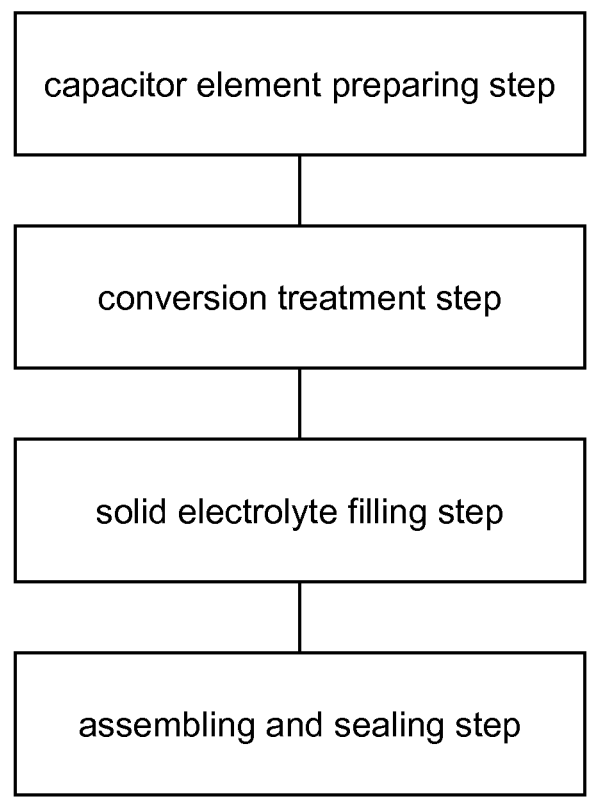
FIG. 3 is a flowchart for explaining a method of manufacturing a solid electrolyte capacitor according to the embodiment.

FIGS. 1A, 1B and FIGS. 2A, 2B are views for explaining a solid electrolyte capacitor 1 according to the embodiment. FIG. 1A is a cross-sectional view of the solid electrolyte capacitor 1 according to the embodiment, and FIG. 1B is a perspective view of a capacitor element 20. FIG. 2A is a cross-sectional view of an essential part of the solid electrolyte capacitor 1 according to the embodiment, and FIG. 2B is a cross-sectional view of an essential part of a electrolyte capacitor 1a according to a comparison example which uses an electrolytic solution 31 as an electrolyte.

The solid electrolyte capacitor 1 according to the embodiment is a winding-type solid electrolyte capacitor. As shown in FIG. 1, the solid electrolyte capacitor 1 includes: a cylindrical bottomed metal case 10; a capacitor element 20; and a seal member 40.

A bottom surface portion of the metal case 10 has an approximately circular shape, and a valve (not shown in the drawing) is formed on a portion of the bottom surface portion in the vicinity of the center of the bottom surface portion. In this manner, the metal case 10 is configured such that the valve is split when an internal pressure is increased so as to leak the internal pressure to the outside. A side surface portion of the metal case 10 is raised from an outer edge of the bottom surface portion in the direction approximately perpendicular to the bottom surface portion. An opening of the metal case 10 is sealed by the seal member 40. Two leads 29, 30 of the capacitor element 20 are pulled out to the outside the metal case 10 through penetration holes formed in the seal member 40.

The capacitor element 20 is stored in the inside of the metal case 10. As shown in FIG. 1B, an anode foil 21 and a cathode foil 23 are wound in an overlapping manner with a separator 25 interposed between the anode foil 21 and the cathode foil 23. A solid electrolyte 26 is disposed between the anode foil 21 and the cathode foil 23.

The anode foil 21 is made of valve metal such as aluminum, tantalum, niobium. A surface of the anode foil 21 is roughened by etching treatment and, thereafter, an oxide film 22 is formed on the surface of the anode foil 21 by chemical conversion treatment.

In the same manner as the anode foil 21, the cathode foil 23 is also made of valve metal such as aluminum, tantalum, niobium. In the same manner as the anode foil 21, a surface of the cathode foil 23 is roughened by etching treatment and, thereafter, an oxide film 24 is formed on the surface of the cathode foil 23 by natural oxidization. The anode foil 21 and the cathode foil 23 are electrically connected to the lead 29 and the lead 30 respectively.

A width of the separator 25 is set larger than winding widths of the anode foil 21 and the cathode foil 23. The separator 25 is made to overlap with the anode foil 21 and the cathode foil 23 so as to sandwich the anode foil 21 and the cathode foil 23 therebetween. The separator 25 may be formed using a heat resistant cellulose paper or a heat resistant flame proof paper.

In the solid electrolyte capacitor 1 according to the embodiment having such a constitution, in a gap formed between the anode foil 21 and the cathode foil 23, the solid electrolyte 26 which contains conductive fine particles 27 containing a conductive polymer compound and a hydrophilic polymer compound 28 is filled.

The hydrophilic polymer compound 28 has a structure expressed by the following chemical formula (I) and a structure expressed by the following chemical formula (II).

  (I)

  (II)

(In the formula (I) and the formula (II), $R^1$ and $R^2$ are groups selected from the set consisting of a substituted or unsubstituted alkylene, a substituted or unsubstituted alkenylene, and a substituted or unsubstituted phenylene, and represent mutually different groups).

The hydrophilic polymer compound 28 may be a block copolymer including a structure expressed by a following chemical formula (III) and a structure expressed by a following chemical formula (IV) or may be a copolymer including a structure expressed by a following chemical formula (V).

  (III)

  (IV)

  (V)

In this case, in the formula (III) and the formula (IV), n and m are respectively integers which fall within a range of 1 to 2,000, while in the formula (V), 1 is an integer which falls within a range of 2 to 2,000.

A molecular weight of the hydrophilic polymer compound 28 is more than or equal to 500.

When a differential scanning calorimetry curve of the hydrophilic polymer compound is measured using a differential scanning calorimeter, an endothermic peak of the hydrophilic polymer compound 28 based on a change in form is not observed at a temperature higher than a room temperature.

The hydrophilic polymer compound 28 contains moisture such that the content of moisture falls within a range of 1 wt % to 40 wt % with respect to the hydrophilic polymer compound.

The hydrophilic polymer compound 28 may contain a hydrophilic functional group at a side chain. In this case, as a hydrophilic functional group, a functional group which is made of a hydroxy group, an amino group, a carbonyl group, a carboxyl group, a nitro group, a sulfonic acid group, an amide group or a phosphate ester group can be preferably exemplified.

The hydrophilic polymer compound 28 may contain a bonding chain which exhibits hydrogen bonding in a main chain. In this case, the bonding chain which exhibits hydrogen bonding and is made of an ether group, a carbonyl group, an amide group or an ester group can be preferably exemplified.

The conductive polymer compound is made of polyethylene dioxithiophene, polythiophene, polypyrrole or polyaniline.

The conductive fine particles 27 may be conductive fine particles which further contain a dopant made of a polystyrene sulfonic acid, a toluene sulfonic acid, an alkylbenzene sulfonic acid or a naphthalene sulfonic acid.

An average particle size of the conductive fine particles may be less than or equal to 1 μm.

2. Method of Manufacturing Solid Electrolyte Capacitor

The solid electrolyte capacitor 1 according to the embodiment can be manufactured by the following method. FIG. 4 to FIG. 6 are views for explaining the method of manufacturing the solid electrolyte capacitor according to the embodiment. Among these drawings, FIG. 4 is a view for explaining a chemical conversion treatment step, FIG. 5 is a view for explaining a solid electrolyte filling step, and FIG. 6 is a view for explaining an assembling and sealing step. FIG. 4A to FIG. 4D, FIG. 5A to FIG. 5D and FIG. 6A to FIG. 6C are step views respectively.

(1) Capacitor Element Preparing Step

Firstly, the capacitor element 20 is prepared by winding the anode foil 21 having an uneven surface and forming the oxide film 22 on the uneven surface thereof and the cathode foil 23 having an uneven surface in an overlapping manner with the separator 25 interposed between the anode foil 21 and the cathode foil 23. Accordingly, the prepared capacitor element 20 becomes a capacitor element which includes the anode foil 21 having the surface on which the oxide film 22 is formed, the cathode foil 23, and the separator 25 disposed between the anode foil 21 and the cathode foil 23. In this step, the lead 29 is connected to the anode foil 21, and the lead 30 is connected to the cathode foil 23.

(2) Chemical Conversion Treatment Step

Next, as shown in FIG. 4, the capacitor element 20 is immersed into a chemical conversion liquid 52 (for example, an aqueous solution of adipic acid ammonium, ammonium borate, ammonium phosphate, glutaric acid ammonium, azelaic acid ammonium, ammonium tartrate, sebacic ammonium, pimelic acid ammonium, suberic acid ammonium or the like) in a chemical conversion liquid bath 50, and a voltage of 100V is applied between the lead 29 on an anode side and the chemical conversion liquid 52 for 5 minutes thus repairing an oxide film defect occurred part existing at an end portion of the anode foil 21 and an oxide film defect occurred part which may exist on a surface of the anode foil 21.

(3) Solid Electrolyte Filling Step

Next, a solid electrolyte filled solution 62 which contains conductive fine particles 27 containing a conductive polymer compound and a hydrophilic polymer compound 28 is impregnated into a gap formed between the anode foil and the cathode foil, and the solid electrolyte filled solution 62 is dried thus filling the solid electrolyte 26 containing the conductive fine particles 27 and the hydrophilic polymer compound 28 in the gap formed between the anode foil 21 and the cathode foil 23.

To be more specific, as shown in FIG. 5, the solid electrolyte filling step is performed by immersing the capacitor element 20 into the solid electrolyte filled solution (aqueous solution) 62 in the solid electrolyte filling bath 60 and, thereafter, by drying the capacitor element 20.

In this step, as a hydrophilic polymer compound, a compound having the structure expressed by the following chemical formula (I) and the structure expressed by the following chemical formula (II), (for example, polyoxyethylene polyoxypropylene glycol) is used.

$$—(R^1—O)—  \quad (I)$$

$$—(R^2—O)—  \quad (II)$$

wherein, in the formula (I) and the formula (II), $R^1$ and $R^2$ are groups selected from the set consisting of a substituted or unsubstituted alkylene, a substituted or unsubstituted alkenylene, and a substituted or unsubstituted phenylene, and represent mutually different groups.

(4) Assembling and Sealing Step

Lastly, the seal member 40 is mounted on the capacitor element 20, and the capacitor element 20 is inserted into the metal case 10 and, thereafter, the metal case 10 is caulked in the vicinity of an open end of the metal case 10. Then, an aging step is performed by applying a predetermined voltage to the metal case 10 under a high temperature atmosphere. Due to such steps, the solid electrolyte capacitor 1 according to the embodiment is completed.

Although the method of manufacturing a solid electrolyte capacitor according to the embodiment has been explained heretofore, the present invention is not limited to such an embodiment, and various modifications are conceivable without departing from the gist of the present invention.

3. Advantageous Effects of the Embodiment

According to the solid electrolyte capacitor 1 of the embodiment constituted as described above (manufactured by the above-mentioned manufacturing method), a solid electrolyte can be formed without using an oxidizing agent for polymerization and hence, in the same manner as a conventional solid electrolyte capacitor, it is possible to provide a solid electrolyte capacitor having a high breakdown strength and a low leakage current without bringing about the deterioration of an oxide film which may be caused under the presence of an oxidizing agent for polymerization.

According to the solid electrolyte capacitor 1 of the embodiment, a hydrophilic polymer compound is filled in the gap formed between the anode foil and the cathode foil and hence, even when a defect occurs in an oxide film in the course of manufacturing a solid electrolyte capacitor, moisture which the hydrophilic polymer compound retains can be used for repairing the above-mentioned defect occurred part whereby it is also possible to provide a solid electrolyte capacitor having a high breakdown strength and a low leakage current.

According to the solid electrolyte capacitor 1 of the embodiment, a hydrophilic polymer compound is filled in the gap formed between the anode foil and the cathode foil and hence, even when a defect occurs in an oxide film as a result of use of the solid electrolyte capacitor for a long time, moisture which the hydrophilic polymer compound retains can be used for repairing the above-mentioned defect occurred part whereby it is possible to manufacture a solid electrolyte capacitor having an extended lifetime.

Further, according to the solid electrolyte capacitor 1 of the embodiment, the hydrophilic polymer compound has the above-mentioned structure expressed by the chemical formula (I) and the above-mentioned structure expressed by the chemical formula (II) and hence, the solid electrolyte capacitor of the present invention acquires the following advantageous effects.

The content of moisture in the hydrophilic polymer compound minimally changes (that is, a water retention ability of the hydrophilic polymer compound is increased) and hence, even when the solid electrolyte capacitor is used for a long time, moisture minimally leaves from the solid electrolyte capacitor.

A change in form of the hydrophilic polymer compound (eventually the solid electrolyte) due to a change in temperature minimally occurs and hence, even when a temperature elevation and lowering cycle between a normal temperature (a temperature when the solid electrolyte capacitor is not used) and a high temperature (a temperature when the solid electrolyte capacitor is used) is repeated many times, an oxide film minimally deteriorates. As a result, even when the solid electrolyte capacitor is used under a harsh condition for a long time, moisture can be retained over a longer time than a conventional solid electrolyte capacitor and, at the same time, a change in form of the hydrophilic polymer compound can be suppressed over a longer time than a conventional solid electrolyte capacitor and hence, it is possible to provide a solid electrolyte capacitor having a longer lifetime than a conventional solid electrolyte capacitor.

As a result, the solid electrolyte capacitor 1 of the embodiment becomes a solid electrolyte capacitor having a high breakdown strength, a low leakage current and a longer extended lifetime than a conventional solid electrolyte capacitor.

In the solid electrolyte capacitor 1 of the embodiment, the hydrophilic polymer compound has the above-mentioned structure expressed by the chemical formula (I) and the above-mentioned structure expressed by the chemical formula (II). Accordingly, it is possible to finely adjust various attributes of the hydrophilic polymer compound such as a viscosity, a solidification point, a melting point or a boiling point in a wide range thus providing a solid electrolyte capacitor flexibly adaptable to various and broad applications.

In the solid electrolyte capacitor 1 of the embodiment, by forming the hydrophilic polymer compound 28 using the block copolymer which includes the above-mentioned structure expressed by the chemical formula (III) and the above-mentioned structure expressed by the chemical formula (IV), it is possible to provide a hydrophilic polymer compound having a high moisture retention ability thus exhibiting an excellent oxide film repairing function. As a result, it is possible to provide a solid electrolyte capacitor having a high breakdown strength and a low leakage current and having a more extended lifetime than a conventional solid electrolyte capacitor. Further, various attributes of the hydrophilic polymer compound such as viscosity, a solidification point, a melting point and a boiling point can be easily adjusted by suitably selecting or adjusting kinds of $R^1$, $R^2$, a range of n, m, and the number and the distribution of blocks and hence, it is possible to provide a solid electrolyte capacitor which is flexibly adaptable to broad and various applications.

In the solid electrolyte capacitor 1 of the embodiment, by forming the hydrophilic polymer compound 28 using the copolymer which includes the above-mentioned structure expressed by the chemical formula (V), it is also possible to provide a hydrophilic polymer compound having a high moisture retention ability thus exhibiting an excellent oxide film repairing function. As a result, it is possible to provide a solid electrolyte capacitor having a high breakdown strength and a low leakage current and having a more extended lifetime than a conventional solid electrolyte capacitor. Further, various attributes of the hydrophilic polymer compound such as viscosity, a solidification point, a melting point and a boiling point can be easily adjusted by suitably selecting or adjusting kinds of $R^1$, $R^2$, and a range of 1 and hence, it is possible to provide a solid electrolyte capacitor which is flexibly adaptable to broad and various applications.

According to the solid electrolyte capacitor 1 of the embodiment, the molecular weight of the hydrophilic polymer compound is more than or equal to 500 and hence, the content of moisture in the hydrophilic polymer compound minimally changes (that is, a moisture retention ability of the hydrophilic polymer compound is increased). As a result, even when the solid electrolyte capacitor is used for a long time, the moisture leaves more minimally.

According to the solid electrolyte capacitor 1 of the embodiment, when a differential scanning calorimetry curve of a hydrophilic polymer compound is measured using a differential scanning calorimeter, an endothermic peak of the hydrophilic polymer compound based on a change in form is not observed at a temperature higher than a room temperature. Accordingly, a change in form of the hydrophilic polymer compound (eventually the solid electrolyte) due to a change in temperature minimally occurs and hence, even when a temperature elevation and lowering cycle between a normal temperature (a temperature when the solid electrolyte capacitor is not used) and a high temperature (a temperature when the solid electrolyte capacitor is used) is repeated many times, an oxide film minimally deteriorates.

According to the solid electrolyte capacitor 1 of the embodiment, a hydrophilic polymer compound contains more than or equal to 1 wt % of moisture with respect to the hydrophilic polymer compound and hence, even when a defect occurs in an oxide film as a result of the use of the solid electrolyte capacitor for a long time, the above-mentioned defect occurred part is effectively repaired due to a function of moisture which the hydrophilic polymer compound retains and hence, the solid electrolyte capacitor having an extended lifetime can be provided. The hydrophilic polymer compound contains less than or equal to 40 wt % of moisture with respect to the hydrophilic polymer compound and hence, the hydrophilic polymer compound can usually exhibit a sufficient oxide film repairing function, and a drawback caused by freezing under a low temperature environment or a drawback caused by the elevation of an internal pressure under a high temperature environment can be reduced.

In the solid electrolyte capacitor 1 of the embodiment, by using a compound which contains a hydrophilic functional group (for example, a hydroxy group, an amino group, a carbonyl group, carboxyl group, a nitro group, a sulfonic acid group, amide group or a phosphate ester group) at a side chain as the hydrophilic polymer compound, a moisture retention ability of the hydrophilic polymer compound can be further increased.

In the solid electrolyte capacitor 1 of the embodiment, by using a hydrophilic polymer compound which contains the bonding chain which exhibits hydrogen bonding (for example, an ether group, a carbonyl group, an amide group or an ester group) as the hydrophilic polymer compound at a main chain, a moisture retention ability of the hydrophilic polymer compound can be further increased.

According to the solid electrolyte capacitor 1 of the embodiment, the conductive polymer compound is made of polyethylene dioxithiophene, polythiophene, polypyrrole or polyaniline and hence, conductive fine particles having high conductivity can be formed and, eventually, a solid electrolyte having high conductivity can be formed thus providing a solid electrolyte capacitor having a low ESR.

According to the solid electrolyte capacitor 1 of the embodiment, when the conductive fine particles further contain a dopant made of a polystyrene sulfonic acid, a toluene sulfonic acid, an alkylbenzene sulfonic acid or a naphthalene sulfonic acid, from this point of view, conductive fine particles having high conductivity can be formed and, eventually, a solid electrolyte having high conductivity can be formed thus providing a solid electrolyte capacitor having a low ESR.

According to the solid electrolyte capacitor 1 of the embodiment, when an average particle size of the conductive fine particles is less than or equal to 1 μm, conductive fine particles can be filled into a gap formed between the anode foil and the cathode foil with high density thus providing a solid electrolyte capacitor having a lower ESR.

According to the method of manufacturing a solid electrolyte capacitor of the embodiment, as described previously, it is possible to manufacture a solid electrolyte capacitor having a high breakdown strength, a low leakage current and a more extended lifetime than a conventional solid electrolyte capacitor by a simple method.

According to the method of manufacturing a solid electrolyte capacitor of the embodiment, the method further includes the chemical conversion treatment step between the capacitor element preparing step and the solid electrolyte filling step and hence, it is possible to suppress the consumption of moisture which the hydrophilic polymer compound retains in the step of preparing the capacitor element and hence, a solid electrolyte capacitor having a more extended lifetime can be manufactured.

According to the method of manufacturing a solid electrolyte capacitor of the embodiment, the solid electrolyte filled solution is an aqueous solution and hence, it is possible to make the hydrophilic polymer compound retain a larger amount of moisture and hence, it is possible to manufacture a solid electrolyte capacitor having a more extended lifetime.

Test Examples

The following test examples 1 to 3 are test examples which prove that the solid electrolyte capacitor of the present invention is a solid electrolyte capacitor having a high breakdown strength, and a low leakage current and having a more extended lifetime than a conventional solid electrolyte capacitor.

FIG. 7A and FIG. 7B are tables showing data on hydrophilic polymer compounds used in the respective test examples and a result of evaluation of the respective test examples. FIG. 7A is a table showing data on hydrophilic polymer compounds used in the respective test examples, and FIG. 7B is a table showing a result of evaluation of the respective test examples.

Test Example 1

1. Preparation of Specimens

(1) Specimen 1

Embodiment

A capacitor element substantially equal to the solid electrolyte capacitor 1 according to the embodiment is prepared, and is used as a specimen 1. In the specimen 1, as a hydrophilic polymer compound, a hydrophilic polymer compound 1 (polyoxyethylene polyoxypropylene glycol (block copolymer of PEG and PPG, number average molecular weight: 2800, see FIG. 7A)) is used. As a conductive polymer compound, polyethylene dioxithiophene is used. As conductive fine particles, fine particles which also contain a dopant made of polyethylene sulfonic acid are used.

(2) Specimen 2

Comparison Example

A capacitor element substantially equal to the capacitor element of the specimen 1 with respect to the constitution except for the hydrophilic polymer compound is prepared, and is used as a specimen 2. In the specimen 2, as a hydrophilic polymer compound, a hydrophilic polymer compound 2 (polyoxyethylene glycol (PEG, number average molecular weight: 3000, see FIG. 7A)) is used.

(3) Specimen 3

Comparison Example

A capacitor element substantially equal to the capacitor according to the specimen 1 with respect to the constitution except for the hydrophilic polymer compound is prepared, and is used as a specimen 3. In the specimen 3, as a hydrophilic polymer compound, a hydrophilic polymer compound 3 (polyoxyethylene glycol (PEG, number average molecular weight: 300, see FIG. 7A)) is used.

2. Evaluation Method

The respective specimens are placed in a stationary manner in the inside of a temperature and humidity testing chamber at a temperature of 135° C., and a leakage current is measured in a state where a prescribed DC voltage is applied to the respective specimens. The measurement of a leakage current is performed using digital multi meter 73401 made by Yokogawa Meter and Instrument Ltd. for every 250 hours. As a result, the evaluation "good" is given to a case where a leakage current at a point of time that 2000 hours have elapsed from starting the measurement is less than a value 5 times as large as an initial value, and the evaluation "bad" is given to a case where a leakage current at a point of time that 2000 hours have elapsed from starting the measurement is more than or equal to 5 times as large as the initial value.

3. Evaluation Result

Figure 8:
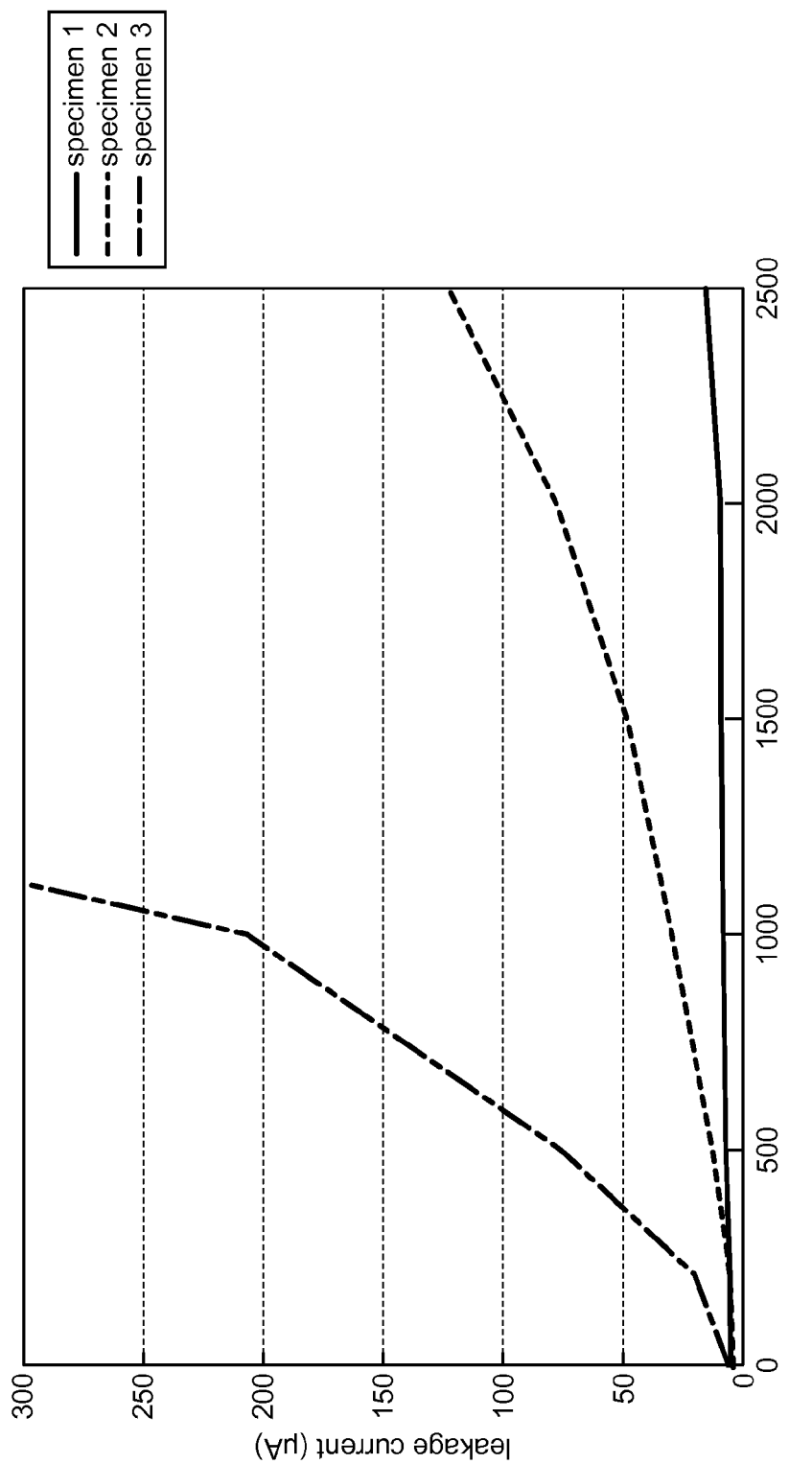
FIG. 8 is a graph showing a result of the test example 1.

FIG. 8 is a graph showing the result of the test example 1.

As can be also understood from FIG. 8, with respect to the specimen 3, a leakage current is increased from a point of time immediately after starting the measurement. The increase of the leakage current is also steep. A leakage current at a point of time that 2000 hours have elapsed from starting the measurement is equal to or more than 5 times larger than an initial value. In the specimen 2, a leakage current is gradually increased from a point of time that 250 hours have elapsed from starting the measurement. A leak current at a point of time that 2000 hours have elapsed from starting the measurement is 5 times or more larger than an initial value. On the other hand, in the specimen 1, a leakage current is minimally increased even when 2500 hours have elapsed from starting the measurement. A leakage current at a point of time 2000 hours have elapsed from starting the measurement is less than 5 times larger than an initial value. From such an evaluation result, it is found that the specimen 1 is a solid electrolyte capacitor having a more extended lifetime than the conventional electrolyte capacitor.

Test Example 2

1. Preparation of Specimens

(1) Specimen 4

Embodiment

An aqueous solution containing a hydrophilic polymer compound 1 used in the test example 1 is filled in a petri dish and, thereafter, the aqueous solution is dried thus preparing a layer made of a viscous body having a thickness of 0.5 mm. The layer is used as a specimen 4.

(2) Specimen 5

Comparison Example

An aqueous solution containing a hydrophilic polymer compound 2 used in the test example 1 is filled in a petri dish and, thereafter, the aqueous solution is dried thus preparing a film having a thickness of 0.5 mm. The film is used as a specimen 5.

(3) Specimen 6

Comparison Example

An aqueous solution containing a hydrophilic polymer compound 3 used in the test example 1 is filled in a petri dish and, thereafter, the aqueous solution is dried thus preparing a viscous body layer having a thickness of 0.5 mm. The layer is used as a specimen 6.

2. Evaluation Method

The respective specimens are put into a temperature and humidity testing chamber respectively, are dried at a temperature of 120° C. for 40 minutes and, thereafter, are dried at a temperature of 150° C. for 20 minutes. Then, weights of the respective specimens when left in the inside of a room are measured. The measurement of the weights is performed using an electronic scale (GZ-600 made by AND Ltd.). The measurement is performed for 50 minutes for every other 5 minutes. As a result, evaluation "good" is given when a change in weight is not observed at a point of time that 30 minutes have elapsed from starting the measurement, and evaluation "bad" is given when a change in weight is measured at the point of time that 30 minutes have elapsed from starting the measurement.

3. Evaluation Result

Figure 9:
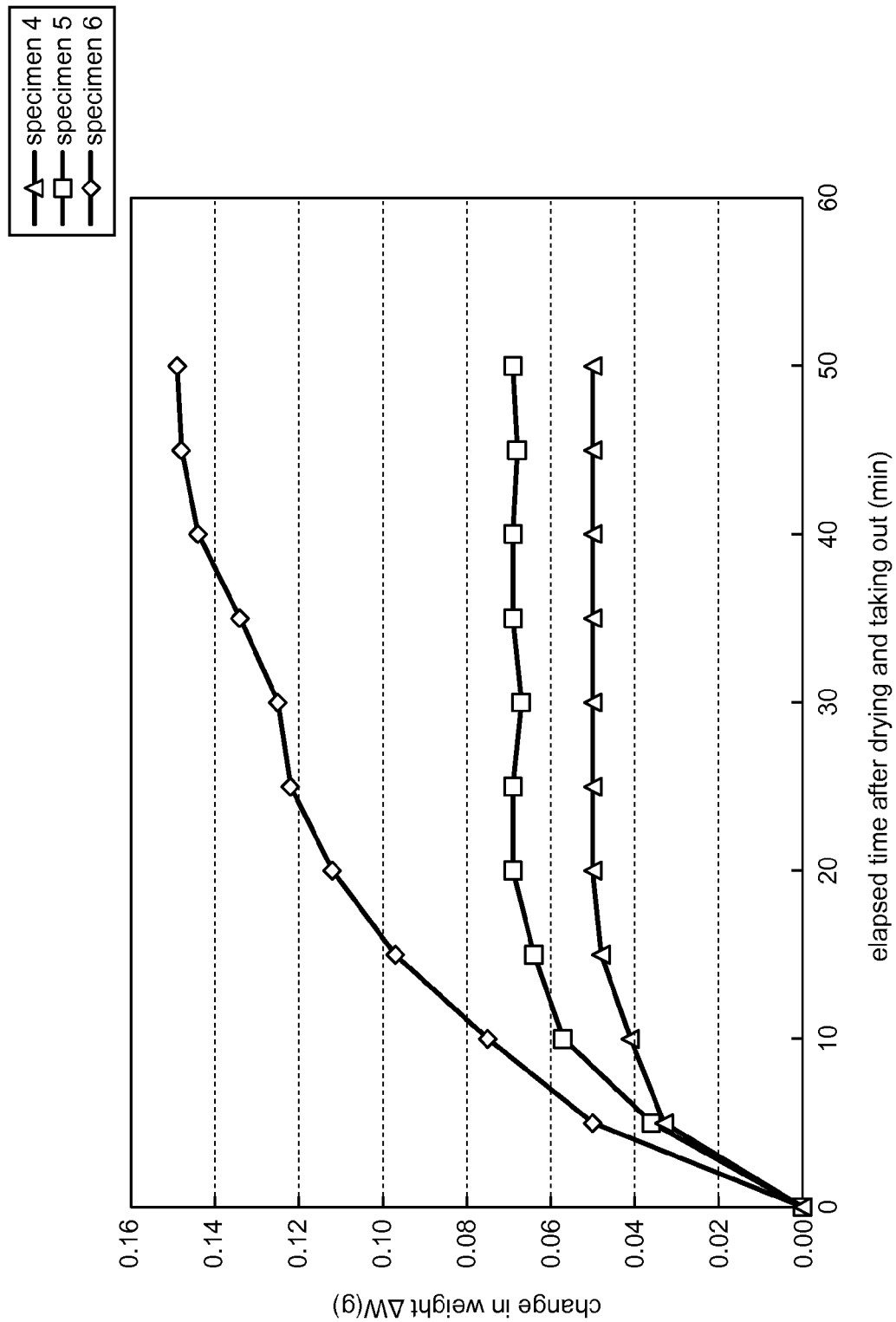
FIG. 9 is a graph showing a result of the test example 2.

FIG. 9 is a graph showing the result of the test example 2.

As can be also understood from a weight change curve shown in FIG. 9, with respect to the specimen 6, the weight is monotonically increased over a period from a point of time immediately after starting the measurement to a point of time that 50 minutes have elapsed from starting the measurement. On the other hand, with respect to the specimen 4 and the specimen 5, although the increase of the weight is observed over a period from a point of time immediately after starting the measurement to a point of time that 20 minutes have elapsed from starting the measurement, the increase of the weight is not observed thereafter. From the above result, with respect to the specimen 4 and the specimen 5, it is found that the content of moisture in a hydrophilic polymer compound minimally changes (that is, a hydrophilic polymer compound exhibits a high moisture retaining ability).

Test Example 3

1. Specimen (1) Specimen 7

Embodiment

A hydrophilic polymer compound 1 used in the test example 1 is pelletized (weight: 4.00 mg), and the pelletized hydrophilic polymer compound 1 is used as a specimen 7.

(2) Specimen 8

Comparison Example

A hydrophilic polymer compound 2 used in the test example 1 is pelletized (weight: 4.00 mg), and the pelletized hydrophilic polymer compound 2 is used as a specimen 8.

(3) Specimen 9

Comparison Example

A hydrophilic polymer compound 3 used in the test example 1 is pelletized (weight: 4.14 mg), and the pelletized hydrophilic polymer compound 3 is used as a specimen 9.

2. Evaluation Method

The evaluation is performed with respect to the respective specimens by measuring a differential scanning calorimetry curve (DSC curve) under a condition of a temperature elevating speed of 10° C./min within a temperature range of +30° C. to +350° C. using a differential scanning calorimeter (Q1000 made by TA Instrument Ltd.). As a result, evaluation "good" is given when an endothermic peak based on a change in form is not observed at a temperature higher than a room temperature, and evaluation "bad" is given when an endothermic peak based on a change in form is observed at a temperature higher than a room temperature.

3. Evaluation Result

Figure 10:
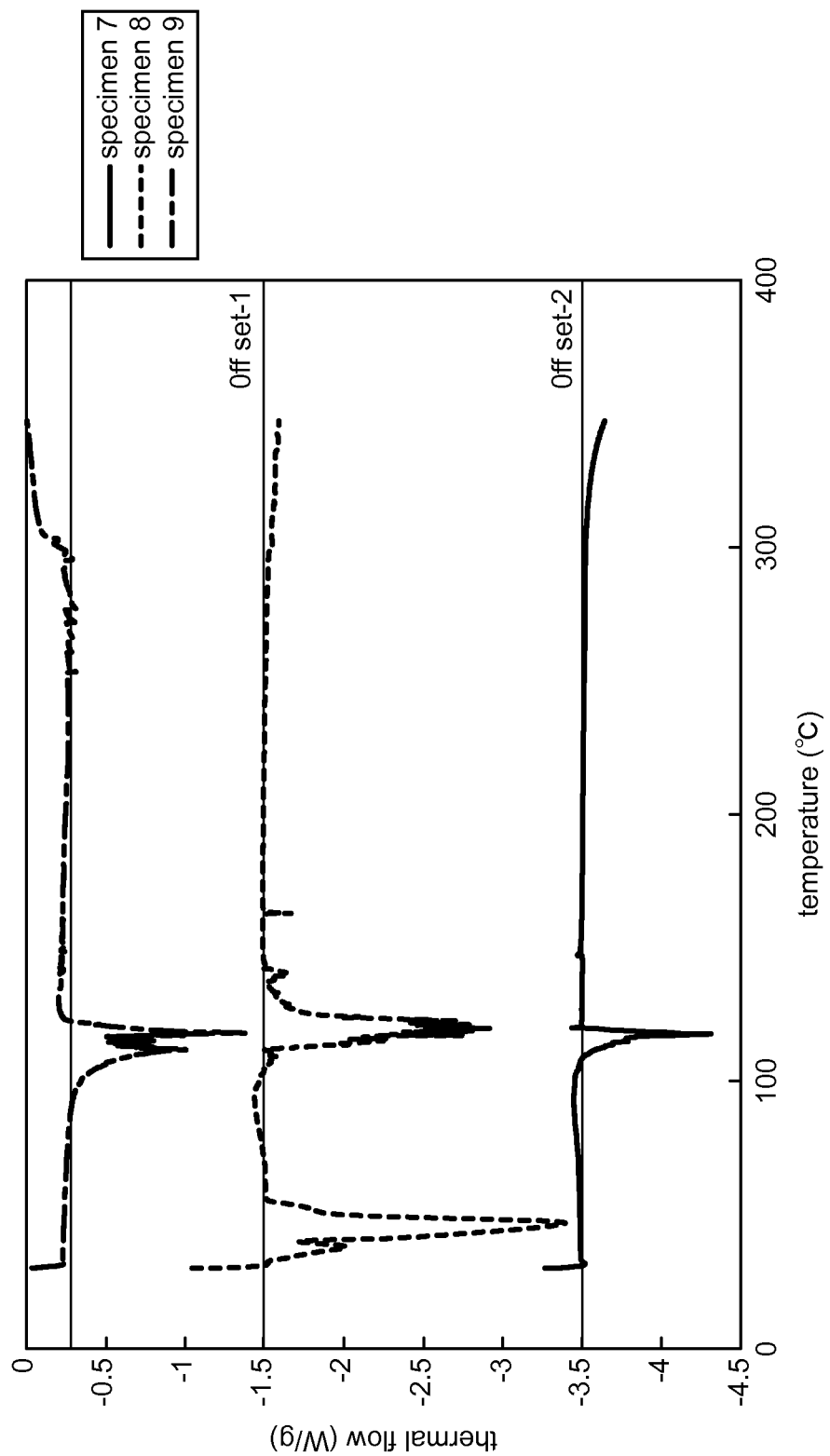
FIG. 10 is a graph showing a result of the test example 3.

FIG. 10 is a graph showing the result of the test example 3.

As can be also understood from the DSC curve shown in FIG. 10, the specimen 8 exhibits an endothermic peak based on a change in form (solid→viscous→liquid) within a temperature range of 35° C. to 50° C. On the other hand, the specimen 7 and the specimen 9 do not exhibit an endothermic peak based on a change in form unlike the specimen 8. From this result, it is found that, with respect to the specimen 7 and the specimen 9, even when a temperature elevation and lowering cycle between a normal temperature (a temperature at the time of not using the solid electrolyte capacitor) and a high temperature (a temperature at the time of using the solid electrolyte capacitor) is repeated many times, a change in form of a hydrophilic polymer compound does not occur (eventually a change in form of a solid electrolyte does not occur. In the specimens 7 to 9, an endothermic curve observed within a temperature range of 110° C. to 125° C. is an endothermic peak generated based on discharging of moisture which a hydrophilic polymer compound retains.

Although the solid electrolyte capacitor and the method of manufacturing a solid electrolyte capacitor according to the present invention have been explained based on the above-mentioned embodiment heretofore, the present invention is not limited to such an embodiment, and various modifications can be performed without departing from the gist of the present invention. For example, the following modifications are conceivable.

(1) In the above-mentioned embodiment, as a hydrophilic polymer compound, "a hydrophilic polymer compound made of a block copolymer which includes the above-mentioned structure expressed by the chemical formula (III) and the above-mentioned structure expressed by the chemical formula (IV)" or "a hydrophilic polymer compound made of a copolymer which includes the above-mentioned structure expressed by the chemical formula (V)" is used. However, the present invention is not limited to such hydrophilic polymer compounds. Hydrophilic polymer compounds other than the above-mentioned hydrophilic polymer compounds may be also used.

(2) In the above-mentioned embodiment, as conductive fine particles, conductive fine particles which contain a conductive polymer compound made of polyethylene dioxithiophene (PEDOT) are used. However, the present invention is not limited to such conductive fine particles. Polythiophene, polypyrrole or polyaniline may be used in place of polyethylene dioxithiophene.

(3) In the above-mentioned embodiment, as conductive fine particles, conductive fine particles which further contain a dopant made of a polystyrene sulfonic acid are used. However, the present invention is not limited to such conductive fine particles. Conductive fine particles which further contain a dopant made of a toluene sulfonic acid, an alkyelbenzene sulfonic acid or a naphthalene sulfonic acid may be used in place of conductive fine particles which contain a polystylene sulfonic acid may be used.

(4) In the above-mentioned embodiment, the solid electrolyte capacitor of the present invention has been explained using a winding-type solid electrolyte capacitor. However, the present invention is not limited to the winding-type solid electrolyte capacitor. The present invention is also applicable to a stacked-type solid electrolyte capacitor and other solid electrolyte capacitors.

The invention claimed is:

1. A solid electrolyte capacitor comprising:
an anode foil on a surface of which an oxide film is formed;
a cathode foil; and
a separator disposed between the anode foil and the cathode foil, wherein
a gap formed between the anode foil and the cathode foil is filled with a solid electrolyte which contains a conductive fine particles containing a conductive polymer compound and a hydrophilic polymer compound,
when a defect occurs in the oxide film, moisture which the hydrophilic polymer compound retains can be used for repairing the defect, and
the hydrophilic polymer compound has a structure expressed by a following chemical formula (I) and a structure expressed by a following chemical formula (II):

$$—(R^1—O)—\qquad\qquad (I)$$

$$—(R^2—O)—\qquad\qquad (II)$$

(In the formula (I) and the formula (II), $R^1$ and $R^2$ are groups selected from the set consisting of a substituted or unsubstituted alkylene, a substituted or unsubstituted alkenylene, and a substituted or unsubstituted phenylene, and represent mutually different groups).

2. The solid electrolyte capacitor according to claim 1, wherein the hydrophilic polymer compound is made of a block copolymer including a structure expressed by a following chemical formula (III) and a structure expressed by a following chemical formula (IV):

$$—(R^1—O)n-\qquad\qquad (III)$$

$$—(R^2—O)m-\qquad\qquad (IV)$$

(In the formula (III) and the formula (IV), n and m are respectively integers which fall within a range of 1 to 2,000).

3. The solid electrolyte capacitor according to claim 1, wherein the hydrophilic polymer compound is made of a copolymer including a structure expressed by a following chemical formula (V):

$$—[(R^1—O)—(R^2—O)]_l-\qquad\qquad (V)$$

(in the formula (V), l is an integer which falls within a range of 2 to 2,000).

4. The solid electrolyte capacitor according to claim 1, wherein a molecular weight of the hydrophilic polymer compound is more than or equal to 500.

5. The solid electrolyte capacitor according to claim 1, wherein when a differential scanning calorimetry curve of the hydrophilic polymer compound is measured using a differential scanning calorimeter, an endothermic peak of the hydrophilic polymer compound based on a change in form is not observed at a temperature higher than a room temperature.

6. The solid electrolyte capacitor according to claim 1, wherein the hydrophilic polymer compound contains moisture such that the content of moisture falls within a range of 1 wt % to 40 wt % with respect to the hydrophilic polymer compound.

7. The solid electrolyte capacitor according to claim 1, wherein the hydrophilic polymer compound contains a hydrophilic functional group at a side chain.

8. The solid electrolyte capacitor according to claim 7, wherein the hydrophilic functional group is a hydroxy group, an amino group, a carbonyl group, a carboxyl group, a nitro group, a sulfonic acid group, amide group or a phosphate ester group.

9. The solid electrolyte capacitor according to claim 1, wherein the hydrophilic polymer compound contains a bonding chain which exhibits hydrogen bonding in a main chain.

10. The solid electrolyte capacitor according to claim 9, wherein the bonding chain which exhibits hydrogen bonding is made of an ether group, a carbonyl group, an amide group or an ester group.

11. The solid electrolyte capacitor according to claim 1, wherein the conductive polymer compound is made of polyethylene dioxithiophene, polythiophene, polypyrrole or polyaniline.

12. The solid electrolyte capacitor according to claim 1, wherein the conductive fine particles further contain a dopant made of a polystyrene sulfonic acid, a toluene sulfonic acid, an alkylbenzene sulfonic acid or a naphthalene sulfonic acid.

13. The solid electrolyte capacitor according to claim 1, wherein an average particle size of the conductive fine particles is less than or equal to 1 μm.

14. The solid electrolyte capacitor according to claim 1, wherein the solid electrolyte capacitor is a winding-type solid electrolyte capacitor.

15. A method of manufacturing a solid electrolyte capacitor comprising:
a capacitor element preparing step for preparing a capacitor element which includes an anode foil on a surface of which an oxide film is formed, a cathode foil, and a separator disposed between the anode foil and the cathode foil; and
a solid electrolyte filling step for filling a solid electrolyte which contains conductive fine particles containing a conductive polymer compound and a hydrophilic polymer compound into a gap formed between the anode foil and the cathode foil by impregnating a solid electrolyte filling solution containing the conductive fine particles and the hydrophilic polymer compound into the gap disposed between the anode foil and the cathode foil and by drying the solid electrolyte filled solution, wherein
when a defect occurs in the oxide film, moisture which the hydrophilic polymer compound retains can be used for repairing the defect, and
the hydrophilic polymer compound has a structure expressed by a following chemical formula (I) and a structure expressed by a following chemical formula (II):

$$—(R^1—O)—\qquad\qquad (I)$$

$$—(R^2—O)—\qquad\qquad (II)$$

(In the formula (I) and the formula (II), R1 and R2 are groups selected from the set consisting of a substituted or unsubstituted alkylene, a substituted or unsubstituted alkenylene, and a substituted or unsubstituted phenylene, and represent mutually different groups).

16. The method of manufacturing a solid electrolyte capacitor according to claim 15, wherein the method further includes, between the capacitor element preparing step and the solid electrolyte filling step, a chemical conversion treatment step for repairing an oxide film defect occurred part which may exist on at least an edge surface or a front surface of the anode foil when the capacitor element is immersed into a chemical conversion liquid.

17. The method of manufacturing a solid electrolyte capacitor according to claim 15, wherein the solid electrolyte filled solution is an aqueous solution.

* * * * *